(12) United States Patent
Saitou et al.

(10) Patent No.: US 11,467,285 B2
(45) Date of Patent: Oct. 11, 2022

(54) IMAGE RECOGNITION DEVICE AND DISTANCE IMAGE GENERATION METHOD

(71) Applicant: PANASONIC INTELLECTUAL PROPERTY MANAGEMENT CO., LTD., Osaka (JP)

(72) Inventors: Shigeru Saitou, Kyoto (JP); Shinzo Koyama, Osaka (JP); Masato Takemoto, Osaka (JP); Motonori Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 547 days.

(21) Appl. No.: 16/497,754

(22) PCT Filed: Mar. 12, 2018

(86) PCT No.: PCT/JP2018/009376
§ 371 (c)(1),
(2) Date: Sep. 25, 2019

(87) PCT Pub. No.: WO2018/180391
PCT Pub. Date: Oct. 4, 2018

(65) Prior Publication Data
US 2020/0025932 A1    Jan. 23, 2020

(30) Foreign Application Priority Data

Mar. 30, 2017    (JP) .............................. JP2017-068085

(51) Int. Cl.
*G01S 17/86* (2020.01)
*G06V 20/56* (2022.01)
*G01S 17/89* (2020.01)

(52) U.S. Cl.
CPC .............. *G01S 17/86* (2020.01); *G01S 17/89* (2013.01); *G06V 20/56* (2022.01)

(58) Field of Classification Search
CPC ...... G01S 7/4865; G01S 17/10; G01S 17/894; G01S 17/18; G01S 7/4868; G01S 17/89;
(Continued)

(56) References Cited

U.S. PATENT DOCUMENTS 10,267,621 B2 * 4/2019 Kuga ................... G01B 11/026
2002/0036765 A1 * 3/2002 McCaffrey ............ G01S 17/894
356/5.08

(Continued)

FOREIGN PATENT DOCUMENTS

JP    2001-148867 A    5/2001
JP    2008-241435 A    10/2008
(Continued)

OTHER PUBLICATIONS

Extended Euopean Search Report issued in corresponding European Patent Application No. 18775304.1, dated Mar. 5, 2020.
(Continued)

*Primary Examiner* — Negussie Worku
(74) *Attorney, Agent, or Firm* — McDermott Will & Emery LLP

(57) ABSTRACT

An image recognition device includes a light source that emits lighting pulses to a measurement space, a image generator that generates a distance image based on reflected light acquired by a light receiving element, a reflectivity calculator that calculates a correction coefficient corresponding to a reflectivity for each measurement section, and a lighting pulse controller that controls a number of lighting pulses emitted from the light source according to the correction coefficient for each measurement section.

9 Claims, 7 Drawing Sheets

(58) Field of Classification Search
CPC ...... G01S 17/931; G01S 7/4863; G01S 17/32; G01S 17/36; G01S 7/4808; G01S 7/493; G01S 7/4815; G01S 7/484; G01S 7/487; G01S 17/42; G01S 7/4816; G01S 7/497; H04N 5/265; H04N 5/335; H04N 5/353; G01B 11/2527; G02B 5/0294
USPC .......................................................... 358/474
See application file for complete search history.

(56) References Cited

U.S. PATENT DOCUMENTS

| | | | | |
|---|---|---|---|---|
| 2008/0237445 A1* | 10/2008 | Ikeno | .................. | G01S 17/32 250/205 |
| 2011/0304842 A1* | 12/2011 | Kao | .................. | G01S 7/4918 356/5.01 |
| 2012/0177252 A1* | 7/2012 | Korekado | ............ | H04N 5/2256 382/106 |
| 2016/0097841 A1* | 4/2016 | Otani | .................. | G01S 7/4808 356/5.03 |
| 2016/0161611 A1* | 6/2016 | Ito | .................. | G01S 17/86 356/51 |
| 2019/0072673 A1* | 3/2019 | Ito | .................. | G01S 17/86 |
| 2020/0018824 A1* | 1/2020 | Nagata | ............... | G01S 7/4863 |
| 2021/0396881 A1* | 12/2021 | Maeda | .................. | G01C 3/06 |
| 2022/0091262 A1* | 3/2022 | Kubota | ............... | G01S 7/4817 |

FOREIGN PATENT DOCUMENTS

| | | |
|---|---|---|
| JP | 2012-168049 A | 9/2012 |
| WO | 2015/176953 A1 | 11/2015 |
| WO | 2016/084323 A1 | 6/2016 |

OTHER PUBLICATIONS

International Search Report and Written Opinion dated Apr. 24, 2018 in International Patent Application No. PCT/JP2018/009376; with partial English translation.

* cited by examiner

BEFORE LIGHTING PULSE CONTROL

IMAGE RECOGNITION DEVICE AND DISTANCE IMAGE GENERATION METHOD

CROSS-REFERENCE OF RELATED APPLICATIONS

This application is the U.S. National Phase under 35 U.S.C. § 371 of International Patent Application No. PCT/JP2018/009376, filed on Mar. 12, 2018, which in turn claims the benefit of Japanese Application No. 2017-068085, filed on Mar. 30, 2017, the entire disclosures of which Applications are incorporated by reference herein.

TECHNICAL FIELD

The present disclosure relates to an image recognition device and a distance image generation method.

BACKGROUND ART

A known method for measuring a distance from an image recognition device to an object to be measured (referred to hereinafter as a measurement object) is one so-called a time of flight (TOF) method, which measures a time from emitting light from a light source to a measurement object until the light reflected from the measurement object to return. As compared with other distance measurement method such as a compound eye type, the TOF method has a drawback such that a light source is needed in addition to a distance measurement device but has an advantage such that a distance to a distant object can be measured with higher resolution by having a powerful light source.

For example, PTL 1 discloses a technique aiming at restraining flare in a case where there is a highly reflective region in a capturing range, where a plurality of light sources are provided in a distance image generation device and light amounts of the light sources are independently controlled. In addition, in a distance image generation device disclosed in PTL 2 establishes compatibility between distance image generations at close range and at long range by changing a light emission intensity of a light source between the close range and the long range.

CITATION LIST

Patent Literature

PTL 1: Japanese Unexamined Patent Application Publication No. 2012-168049
PTL 2: International Application Publication No. 2016/084323

SUMMARY OF THE INVENTION

Technical Problems

However, in the configuration as described in PTL 1, which uses the plurality of light sources, a capturing space is divided into a plurality of sub spaces (space division) for emitting the light, which arises a problem in that an increase in number of division causes an increase in a total capturing time and causes a decrease in frame rate.

In addition, in the method as described in PTL 2, which changes the light emission intensity of the light source according to a distance, in a case where there are a plurality of objects to be measured, different objects have different reflectivities, which arises a problem in that it is difficult to measure a distance to a measurement object having a lower reflectivity simply by changing the light emission intensity according merely to a distance.

A technique according to the present disclosure is devised in view of such regards and has an objective to provide a higher-precision image recognition without a decrease in a frame rate for an image recognition device even in a case where a measurement object having a lower reflectivity is present.

Solutions to Problems

An image recognition device according to an aspect of the present disclosure includes: a light source that emits lighting pulses to a measurement space; a light receiver that receives reflected light from a measurement object present in the measurement space; an image generator that receives a light reception signal based on the reflected light from the light receiver and generates a distance image based on the light reception signal; a calculator that divides a time range corresponding to a distance in an emission direction of the lighting pulses into a plurality of measurement sections and calculates a correction coefficient corresponding to a reflectivity for each of the plurality of measurement sections; and a lighting pulse controller that adjusts an emission amount of lighting pulses to be emitted from the light source, according to the correction coefficient for each of the plurality of measurement sections.

A distance image generation method according to another aspect of the present disclosure includes: emitting lighting pulses in a predetermined number to a measurement space, and calculating a correction coefficient corresponding to a reflectivity of a measurement object in the measurement space from a distance to the measurement object and an intensity of reflected light; and emitting further lighting pulses of an emission amount corresponding to the correction coefficient to the measurement object, and generating a distance image based on reflected light of the further lighting pulses.

Advantageous Effects of Invention

With the image recognition device and the distance image generation method according to the present disclosure, a higher-precision image recognition can be provided even in a case where a measurement object having a lower reflectivity is present. In addition, the decrease in frame rate can be prevented.

DESCRIPTION OF EXEMPLARY EMBODIMENT

Figure 1:
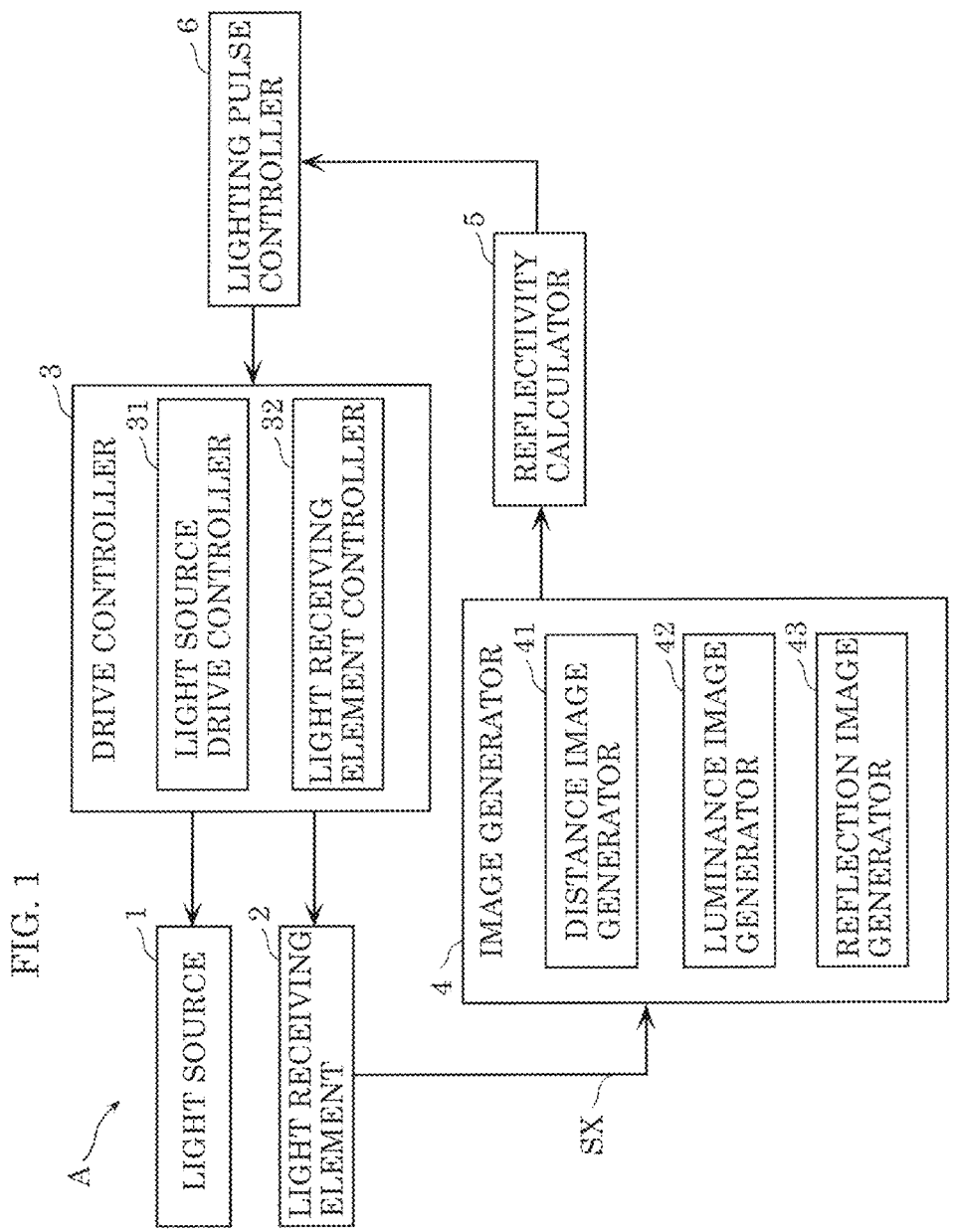
FIG. 1 is a block diagram illustrating a configuration example of an image recognition device according to an embodiment.

An image recognition device according to an aspect of the present disclosure includes: a light source that emits lighting pulses to a measurement space; a light receiver that receives reflected light from a measurement object present in the measurement space; an image generator that receives a light reception signal based on the reflected light from the light receiver and generates a distance image based on the light reception signal; a calculator that divides a time range corresponding to a distance in an emission direction of the lighting pulses into a plurality of measurement sections and calculates a correction coefficient corresponding to a reflectivity for each of the plurality of measurement sections; and a lighting pulse controller that adjusts an emission amount of lighting pulses to be emitted from the light source, according to the correction coefficient for each of the plurality of measurement sections.

Here, the "adjusts an emission amount of lighting pulses" includes adjustment of the number of lighting pulses, adjustment of a light emission intensity of a lighting pulse, and adjustment of a pulse length of a lighting pulse.

With this adjustment, a correction coefficient corresponding to a reflectivity for each of the measurement sections divided into in terms of time is calculated, and according to the correction coefficient, the emission amount of lighting pulses emitted from the light source is adjusted. For example, a light reception intensity of the light receiver can be increased by adjustment to increase the light emission intensity of the lighting pulses as an example of the adjustment of the emission amounts of the lighting pulses according to the correction coefficients. Alternatively, by increasing the numbers of the lighting pulses emitted from the light source, a number of acquisitions of lighting pulses by the light receiver is increased. In this manner, a probability of receiving reflected light by the light receiver is increased even from a measurement object having a lower reflectivity.

As seen from the above, by adjusting the emission amounts of the lighting pulses according to the correction coefficients, an S/N ratio of a signal (reflected light) used in distance image generation in an image generator can be improved. This enables a higher-precision image recognition to be provided even in a case where a measurement object having a lower reflectivity is present.

In addition, as the adjustment of an emission amount of lighting pulses according to a correction coefficient, for example, a number of lighting pulses or lighting pulse intensities may be reduced for a measurement object having a higher reflectivity. In an image having a higher reflectivity, there is a high possibility that reflected light from a measurement object can be received even in a case where the number of lighting pulses is small or the lighting pulse intensity is low. Therefore, even when the number of lighting pulses is reduced, or the lighting pulse intensity is decreased, there is a low probability that a precision of image recognition decreases. At the same time, in consideration of image recognition over an entire frame, reducing the number of lighting pulses for such an image having a higher reflectivity can prevent a decrease in its frame rate. In addition, by decreasing the lighting pulse intensity for an image having a higher reflectivity, power consumption can be reduced.

A distance image generation method according to another aspect of the present disclosure includes: a step of emitting lighting pulses in a predetermined number to a measurement space, and calculating a correction coefficient corresponding to a reflectivity of a measurement object in the measurement space from a distance to the measurement object and an intensity of reflected light; and a step of emitting further lighting pulses of an emission amount corresponding to the correction coefficient to the measurement object, and generating a distance image based on reflected light of the further lighting pulses.

In this method, the emission amounts of the lighting pulses emitted from the light source are configured to be adjusted according to the correction coefficients that are estimated from the distances to the measurement objects and intensities of reflected light. This enables a number of lighting pulses (lighting pulse intensity) to be increased for a measurement object having a lower reflectivity and enables a number of lighting pulses to be decreased for a measurement object having a higher reflectivity. Therefore, a higher-precision image recognition can be provided even in a case where a measurement object having a lower reflectivity is present. In addition, decrease in frame rate can be prevented.

Hereinafter, certain exemplary embodiments are described in greater detail with reference to the accompanying Drawings. It should be noted that all the embodiments described below are generic and specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims Therefore, among the constituent elements in the following embodiments, constituent elements that are not described in independent claims that show the most generic concept of the present disclosure are described as elements constituting more desirable configurations.

FIG. 1 is a block diagram illustrating a configuration example of image recognition device A according to an embodiment. As illustrated in FIG. 1, image recognition device A includes light source 1, light receiving element 2 as a light receiver, drive controller 3 that drives light source 1 and light receiving element 2, image generator 4, reflectivity calculator 5, and lighting pulse controller 6.

Light source 1 emits lighting pulses to a measurement space for which a distance image is to be created. Light source 1 is made up of a laser device, LED, or the like that is configured to emit a light having a wavelength range within the near infrared region (e.g., 800 to 1200 nm), considering how to prevent the light from interfering with human's sight. In addition, light source 1 is in synchronization with light receiving element 2, and an intensity of light source 1 is modulated temporally. In a case where an install place of the image recognition device is a passenger car, the measurement object is, for example, a person going ahead in a travel direction of the passenger car, passenger cars, or the like, and an example of the measurement space is a space ahead in the travel direction. In the following description, a direction in which light source 1 emits lighting pulses will be referred to as an emission direction and a direction perpendicular to the emission direction will be referred to as a perpendicular emission direction.

Light receiving element 2 is an element produced by integrating mainly silicon photo diodes, wiring, and semiconductor materials such as oxide films, and includes a plurality of pixels divided into (disposed in line) in the perpendicular emission direction. The pixels each have a photoelectric converter that receives reflected light reflected from a measurement object in the measurement space and performs photoelectric conversion on the reflected light. In such a manner, light receiving element 2 can obtain information on a measurement object by receiving reflected light from the measurement object.

Drive controller 3 includes light source drive controller 31 that performs drive control on light source 1, and light receiving element controller 32 that performs drive control on light receiving element 2.

Light source drive controller 31 performs the drive control on light source 1 under a predetermined measurement condition during a frame period. Light receiving element controller 32 performs the drive control on light receiving element 2 under a predetermined measurement condition so that light source 1 and light receiving element 2 come in synchronization with each other. The predetermined measurement condition is set based on, for example, a measurement distance time range, which is a time range corresponding to a measurement distance range from a start point being a predetermined position to an end point that is set on a deep side of the start point in the emission direction. More specifically, light source drive controller 31 divides the measurement distance time range into k (k is a natural number equal to or more than 2) measurement sections d1 to dk, and performs the drive control on light source 1 such that a plurality of shots of lighting pulses having the same phase are emitted over measurement sections d1 to dk. In addition, light source drive controller 31 performs the drive control on light source 1 such that lighting pulses having different phases between the measurement sections are emitted. Light receiving element controller 32 performs the drive control on light receiving element 2 such that light receiving element 2 is exposed to the light during at least one of k measurement sections d1 to dk during which light source 1 described above emits the lighting pulses. Light receiving element 2 subjected to the drive control outputs light reception signal SX, which is a result of the exposure, to image generator 4. A value of k, a division number of measurement sections d1 to dk (in other words, a length of each measurement section) can be set at any value. The value may be set at any value based on, for example, a number of lighting pulses for each frame, a required precision of image recognition, or the like.

Image generator 4 includes distance image generator 41 that generates a distance image based on light reception signal SX and luminance image generator 42 that generates a luminance image based on light reception signal SX, and reflection image generator 43.

Distance image generator 41 generates a distance image by estimating a distance to a measurement object based on a time taken by a lighting pulse being reflected from a measurement section where a measurement object is present, until returning.

Figure 2:
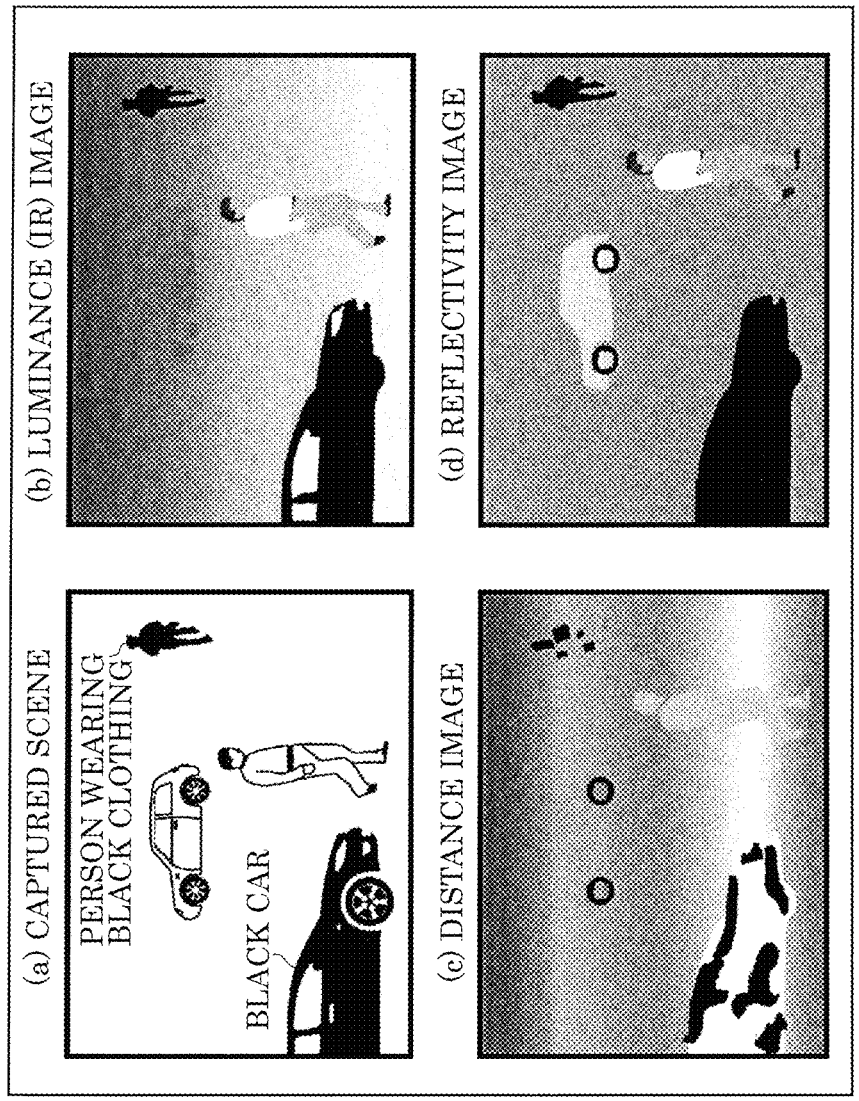
FIG. 2 is a diagram illustrating an example of images generated by an image generator.

FIG. 2 is a diagram illustrating an example of images generated by image generator 4. Specifically, (b) in FIG. 2 illustrates an example of a luminance image in a case where a captured scene illustrated in (a) in FIG. 2 is captured. (c) in FIG. 2 illustrates an example of a distance image similarly in the case where the captured scene illustrated in (a) in FIG. 2 is captured.

The captured scene illustrated in (a) in FIG. 2 illustrates an example in which there are a pedestrian who wears white clothing having a higher reflectivity and a car having a lower reflectivity at close range, and there are a pedestrian who wears black clothing and a white car at long range. In such a captured scene, reflected light reflected from measurement objects having lower reflectivities (e.g., black clothing and black car) can be in some cases so weak that light receiving element 2 cannot receive the reflected light partially in spite of the distance to the measurement objects. In this case, as illustrated in (c) in FIG. 2, portions of a distance image corresponding to the measurement objects having lower reflectivities are broken, which degrades its S/N ratio.

In the present embodiment, therefore, a number of lighting pulses emitted from light source 1 is controlled according to a reflectivity in each of measurement sections d1 to dk. This will be described below in detail.

Reflection image generator 43 generates a reflectivity image based on distance values D acquired from the distance image and luminance values S acquired from the luminance image. Specifically, letting I denote a light emission intensity of light source 1 and R denote a reflectivity of a measurement object, a mathematical relation shown in the following expression (1) is established.

[Expression 1]

$$S \propto I(const) \cdot \frac{R(\text{object})}{D^2} \quad (1)$$

Here, reflection image generator 43 can grasp a light emission intensity of light source 1, and thus reflectivities of measurement objects in measurement sections d1 to dk can be estimated based on distance values D and luminance values S. Reflection image generator 43 generates the reflectivity image based on the estimated reflectivities. (d) in FIG. 2 illustrates an example of a reflectivity image generated based on the luminance image of (b) in FIG. 2 and the distance image of (c) in FIG. 2. As the light emission intensity of light source 1, reflection image generator 43 may refer to a value stored in a memory or the like that is built in beforehand or may receive a signal that indicates the light emission intensity from the outside (e.g., the light source controller).

Reflectivity calculator 5 calculates correction coefficients corresponding to the reflectivities in the measurement sections based on the reflectivity image generated by reflection image generator 43. The correction coefficients may be any correction coefficients that are equivalent to the reflectivities estimated by reflection image generator 43, for example, the reflectivities themselves, values proportional to the reflectivities, or values that can be converted from the reflectivities.

In addition, reflectivity calculator 5 defines a reflectivity satisfying a condition shown by the following expression (2) as a lower reflectivity and counts a number of pixels having lower reflectivities in each of the measurement sections.

[Expression 2]

$$R(\text{object}) < R_{th}(\text{threshold value}) \quad (2)$$

Figure 3:
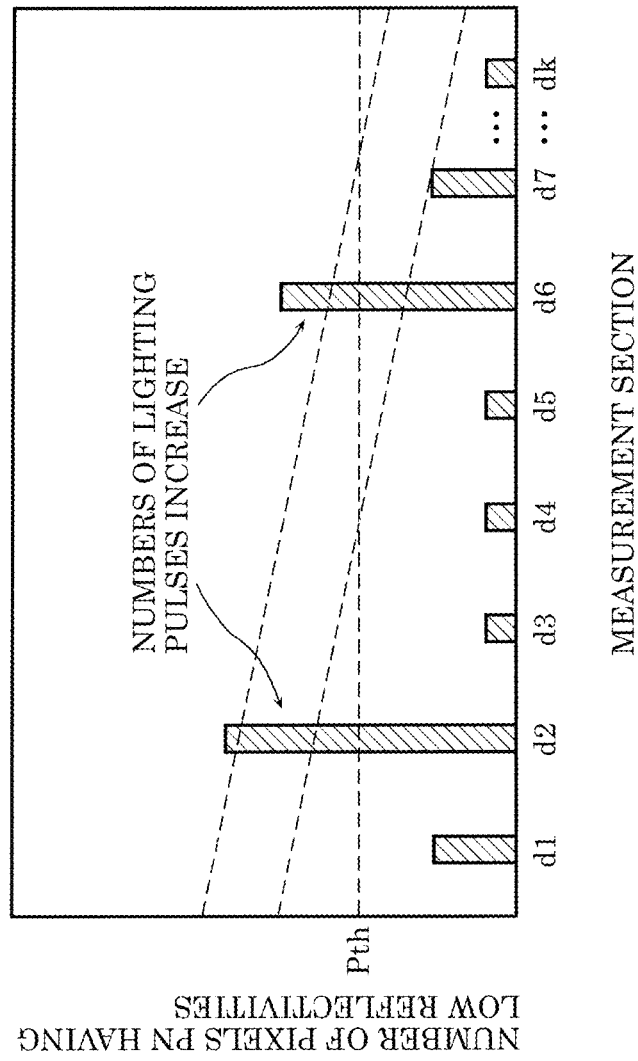
FIG. 3 is a graph illustrating an example of numbers of pixels having lower reflectivities in measurement sections.

Here, threshold value Rth is set at, for example, 10%. In this case, a reflectivity less than 10% is defined as a lower reflectivity. Threshold value Rth is not limited to 10% and can be set at any value. FIG. 3 illustrates numbers of pixels having lower reflectivities in measurement sections d1 to dk in a form of a graph. An abscissa of the drawing indicates k measurement sections d1 to dk into which the aforementioned measurement distance time range is divided. An ordinate indicates a number of pixels having lower reflectivities defined by the expression (2).

Based on the correction coefficients (or the reflectivities) for measurement sections d1 to dk calculated by reflectivity calculator 5, lighting pulse controller 6 performs feedback control on the drive control performed on light source 1 and light receiving element 2 by drive controller 3. Specifically, for example, lighting pulse controller 6 performs control such that a number of lighting pulses emitted from light source 1 is increased for a measurement section in which a number of pixels having lower reflectivities is equal to or larger than a predetermined threshold value Pth. In contrast, lighting pulse controller 6 performs control such that a number of lighting pulses emitted from light source 1 is decreased for a measurement section in which a number of pixels having lower reflectivities is smaller than the predetermined threshold value Pth or no measurement object is present.

Figure 4:
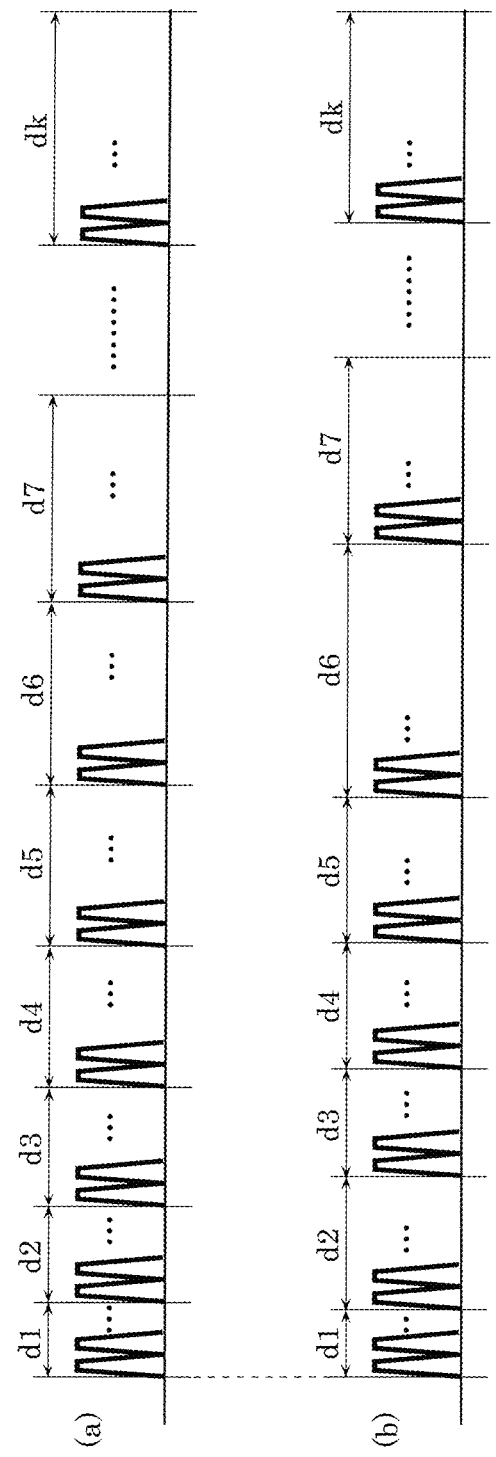
FIG. 4 is a diagram illustrating an example of drive control of a light source and a light receiving element for each frame.

FIG. 4 illustrates an example of the drive control of light source 1 and light receiving element 2 for each frame before and after the feedback control described above is performed. An abscissa of the drawing indicates time, and an ordinate indicates light emission intensity of light source 1. (a) in FIG. 4 illustrates an example of the drive control before the feedback control, where a number of pulses emitted from light source 1 is increased such as to be proportional to a square of a distance value D from light source 1 because reflected light weakens as the distance increases. In contrast, in (b) in FIG. 4, numbers of lighting pulses for measurement sections where numbers of pixels having lower reflectivities exceed the predetermined threshold value (measurement section d2 and measurement section d6 in (b) in FIG. 4) are increased as compared with before the feedback control. At the same time, numbers of lighting pulses for the other measurement sections are decreased.

Figure 5:
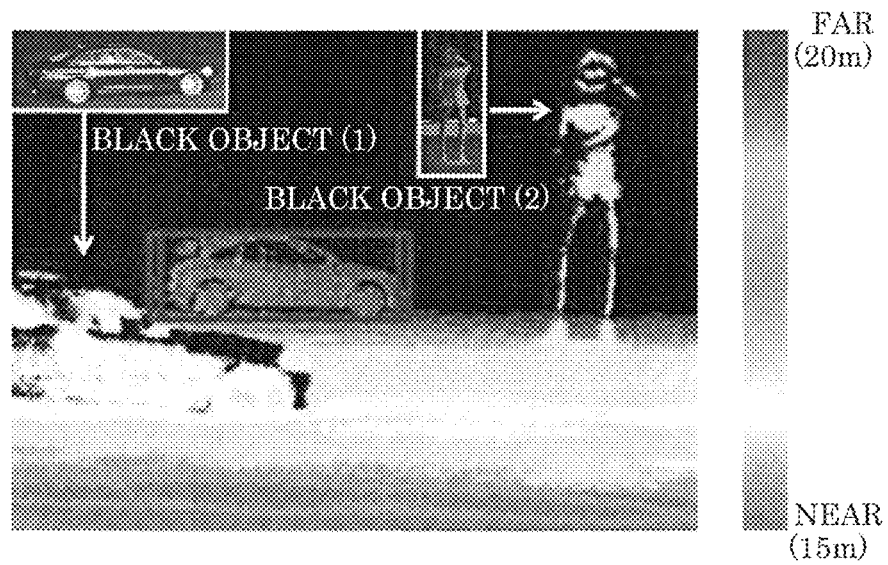
FIG. 5 is a diagram illustrating an example of a distance image before a number of lighting pulses is controlled.
Figure 6:
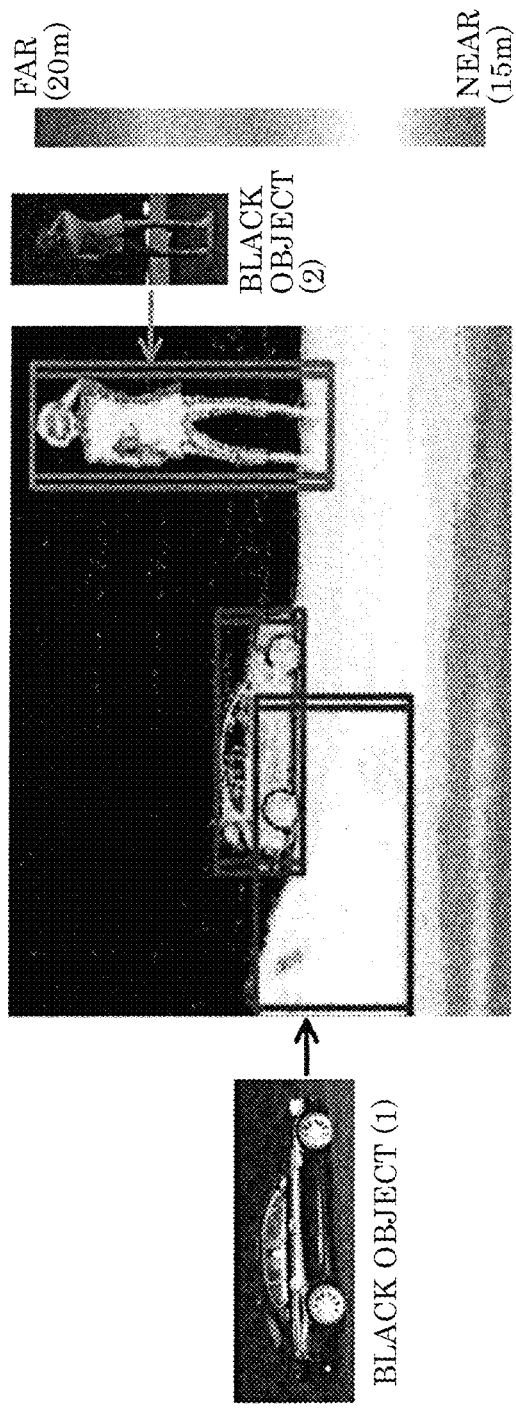
FIG. 6 is a diagram illustrating an example of a distance image after the number of lighting pulses is controlled.

FIG. 5 and FIG. 6 illustrate an example in which distance images are generated for a same measurement object, that is, an example of performing the image recognition. FIG. 5 is a distance image before the feedback control described above, and FIG. 6 is a distance image after the feedback control described above. In the distance image of FIG. 5, portions of the distance image corresponding to a black car and a person wearing black clothing, being measurement objects having lower reflectivities, are broken, but in the distance image of FIG. 6, the broken portions are significantly reduced, and it is understood that a precision of the image recognition is improved.

As seen from the above, according to the present embodiment, measurement sections where measurement objects having lower reflectivities are present can be specified by calculating the reflectivities of measurement sections d1 to dk (e.g., counting numbers of pixels having lower reflectivities). In addition, numbers of lighting pulses are increased for the measurement sections where the measurement objects having lower reflectivities are present. This enables improvement of S/N ratio, and therefore a higher-precision image recognition can be provided even in a case where a measurement object having a lower reflectivity is present.

Moreover, for example, by performing control such that a number of lighting pulses is decreased for a measurement section where a number of pixels having lower reflectivities is small or a measurement section where no measurement object is present, a higher-precision image recognition can be provided without a decrease in a frame rate. That is, a frame rate can be decreased in a case where a precision of image recognition is increased through space division as in related art, but the technique according to the present disclosure can perform the feedback control as described above in a time-sharing system, and thus such a decrease in a frame rate will not occur. For example, in a case where an installation place of the image recognition device is a passenger car, it is possible that there are many measurement sections where measurement objects such as other passenger cars and persons are not present in the measurement space, and a particularly significant effect can be obtained.

Next, a distance image generation method according to the embodiment will be described.

Figure 7:
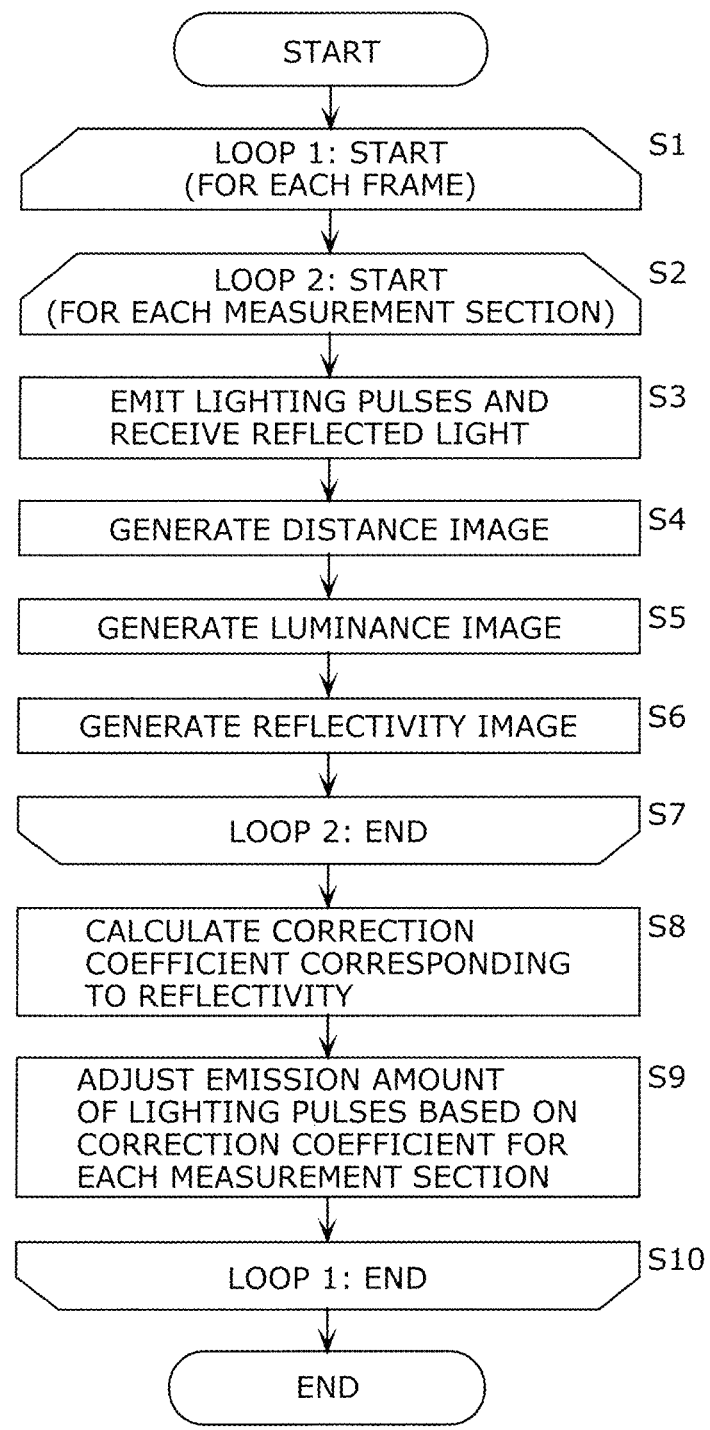
FIG. 7 is a flowchart illustrating an operation example of the image recognition device including a distance image generation method according to an embodiment.

FIG. 7 is a flowchart illustrating an operation example of image recognition device A including the distance image generation method according to the embodiment. In the drawing, steps relating to a distance image constitute the distance image generation method.

In the drawing, image recognition device A divides, in a frame period, a time range corresponding to a distance in an emission direction of the lighting pulses into a plurality of measurement sections d1 to dk, executes loop 1 for each frame, and executes loop 2 for each measurement section.

In loop 2, image recognition device A first emits a predetermined number of lighting pulses from light source 1 to the measurement space and receives reflected light with light receiving element 2 (S3). At this point, in a case where the correction coefficients have already been calculated in the previous frame, the lighting pulses are emitted with emission amounts that are adjusted using the correction coefficients.

Image recognition device A then generates a distance image based on a light reception signal (S4). At this point, distance image generator 41 estimates distances to measurement objects based on times taken by lighting pulses being reflected from measurement sections where the measurement objects are present, until returning.

Image recognition device A then causes luminance image generator 42 to generate a luminance image (S5) and causes reflection image generator 43 to generate a reflectivity image (S6).

After loop 2 is ended, image recognition device A causes reflectivity calculator 5 to calculate correction coefficients corresponding to reflectivities based on the luminance image and the distance image (S8), and causes lighting pulse controller 6 to adjust emission amounts of the lighting pulses based on the correction coefficients for the measurement sections (S9). In step S8, reflectivity calculator 5 may calculate the correction coefficients based on the reflectivity image.

In this calculation, the emission amounts of the lighting pulses emitted from the light source are adjusted according to the correction coefficients that are estimated from the distances to the measurement objects and intensities of reflected light. In this adjustment, for example, numbers of lighting pulses (lighting pulse intensities) are increased for measurement objects having lower reflectivities, and numbers of lighting pulses are decreased for measurement objects having higher reflectivities. Therefore, a higher-precision image recognition can be provided even in a case where a measurement object having a lower reflectivity is present. In addition, the decrease in frame rate can be prevented.

<Other Respects>

In the above embodiment, in the adjustment of the emission amounts of the lighting pulses according to the correction coefficients, the numbers of lighting pulses are configured to be increased for measurement sections where the number of pixels having lower reflectivities satisfying the expression (2) is equal to or larger than the predetermined threshold value, but the adjustment is not limited to this.

For example, as the correction coefficients, the reflectivities R may be obtained based on the relation of the expression (1). Alternatively, a reference value may be set based on the relation of the expression (1), and the correction coefficients may be obtained based on the reference value. For example, in a case where a number of lighting pulses are to be increased or decreased based on a correction coefficient, the number of lighting pulses may be increased by a certain amount for a measurement section where a number of pixels having lower reflectivities is equal to or larger than a predetermined threshold, or an amount of increasing or decreasing of the number of pulses may be adjusted according to a ratio of the number of pixels having lower reflectivities.

Moreover, the numbers of lighting pulses may be normalized in proportion to squares of distances, and the normalized numbers of lighting pulses may be thereafter multiplied by an increase or decrease of the numbers of lighting pulses as described thus far. Typically, an intensity of reflection of light weakens in inverse proportion to a square of a distance because of its diffuse reflection that spreads spherically, and thus the weakening can be compensated in advance for by the normalization described above. Examples of the normalization of the numbers of lighting pulses include a method in which all of the numbers of lighting pulses are made constant.

Furthermore, the above embodiment is described about an example in which the numbers of lighting pulses are adjusted as the emission amounts of the lighting pulses, but as described above, adjustment of light emission intensities of the lighting pulses, adjustment of a pulse length of the lighting pulses, or the like may be performed in addition to or in place of the adjustment of the numbers of lighting pulses, and the adjustments provide the same effect.

In the above embodiment, the "threshold value for a number of pixels having lower reflectivities" that lighting pulse controller 6 uses in the feedback control is configured to be a fixed value as illustrated in FIG. 3, but the threshold value is not limited to this. For example, considering that a viewed size of a measurement object decreases with a distance from light source 1 to the measurement object, the "threshold value for a number of pixels having lower reflectivities" may be decreased as a distance from light source 1 increases, as illustrated by the dash-dot line or the chain double-dashed line in FIG. 3. Alternatively, in a case where a measurement object is identified, such as a person and a passenger car, a threshold value corresponding to the measurement object may be set. In this manner, a presence of a specific measurement object can be determined more reliably. Alternatively, as illustrated by the dash-dot line and the chain double-dashed line in FIG. 3, a plurality of threshold values may be set. FIG. 3 illustrates an example in which a threshold value for persons is set as the dash-dot line, and a threshold value for passenger cars is set as the chain double-dashed line. Alternatively, in a case where the intention is to extract measurement objects having sizes larger than a certain size, the threshold value for a number of pixels having lower reflectivities is determined based on a measurement object having a minimum size (e.g., see the dash-dot line in FIG. 6), by which measurement objects having sizes larger than the minimum size (e.g., a passenger car) can be recognized, and an influence of noise can be prevented.

Moreover, in the above embodiment, reflection image generator 43 generates the reflectivity image based on the distance image and the luminance image, and reflectivity calculator 5 calculates the reflectivities for the measurement sections based on the reflectivity image, but the configuration is not limited to this. For example, reflectivity calculator 5 may be configured to calculate the reflectivities for measurement sections d1 to dk based on the distance image, the luminance image, and the above expression (1), without generating the reflectivity image.

Moreover, in the above embodiment, as the control of the number of lighting pulses according to reflectivity, lighting pulse controller 6 is configured to increase the numbers of lighting pulses emitted from light source 1 based on whether the number of pixels having lower reflectivities exceeds the predetermined threshold value, but the configuration is not limited to this. For example, lighting pulse controller 6 may be configured to increase the numbers of lighting pulses for each of measurement sections d1 to dk (measurement distance ranges) where a percentage of pixels having lower reflectivities obtained from the reflectivity image with respect to all pixels is equal to or higher than a predetermined threshold value, and at a same time, may be configured to decrease the numbers of lighting pulses for each of measurement sections d1 to dk (measurement distance ranges) where the percentage is less than the predetermined threshold value. Also in a case where such control is performed, a higher-precision image recognition can be provided without a decrease in frame rate.

As explained above, the image recognition device according to an aspect of the present disclosure includes: light source 1 that emits lighting pulses to a measurement space; a light receiver (light receiving element 2) that receives reflected light from a measurement object present in the measurement space; image generator 4 that receives a light reception signal based on the reflected light from the light receiver and generates a distance image based on the light reception signal; a calculator (reflectivity calculator 5) that divides a time range corresponding to a distance in an emission direction of the lighting pulses into a plurality of measurement sections and calculates a correction coefficient corresponding to a reflectivity for each of the plurality of measurement sections; and lighting pulse controller 6 that adjusts an emission amount of lighting pulses to be emitted from light source 1, according to the correction coefficient for each of the plurality of measurement sections.

This enables a higher-precision image recognition to be provided even in a case where a measurement object having a lower reflectivity is present. In addition, the decrease in frame rate can be prevented.

Here, it is possible that as the adjustment of the emission amount, lighting pulse controller 6 adjusts a number of the lighting pulses to be emitted from light source 1.

With this configuration, for example, a light reception intensity of the light receiver can be increased by adjustment to increase the light emission intensity of the lighting pulses as an example of the adjustment of the emission amounts of the lighting pulses according to the correction coefficients. Alternatively, by increasing the numbers of the lighting pulses emitted from the light source, a number of acquisitions of lighting pulses by the light receiver can be increased. In this manner, a probability of receiving reflected light by the light receiver is increased even from a measurement object having a lower reflectivity.

As seen from the above, by adjusting the emission amounts of the lighting pulses according to the correction coefficients, an S/N ratio of a signal reflected light used in distance image generation in image generator 4 can be improved. This enables a higher-precision image recognition to be provided even in a case where a measurement object having a lower reflectivity is present.

Here, it is possible that image generator 4 includes distance image generator 41 that generates the distance image based on the reflected light, and luminance image generator 42 that generates a luminance image based on the reflected light, and reflectivity calculator 5 calculates the correction coefficient based on the distance image and the luminance image.

Here, it is also possible that lighting pulse controller 6 performs such control that an emission amount of lighting pulses to be emitted from light source 1 is increased for a measurement section, of the plurality of measurement sections, where a predetermined number or more of pixels having lower reflectivities are present, the lower reflectivities being reflectivities equal to or lower than a predetermined threshold reflectivity.

Here, it is further that lighting pulse controller 6 performs controls to decrease a number of lighting pulses to be emitted from light source 1 on at least one of a measurement section, of the plurality of measurement sections, where a number of pixels having lower reflectivities is smaller than the predetermined number and a measurement section, of the plurality of measurement sections, where the measurement object is not present.

Here, it is still further that lighting pulse controller 6 performs control to (i) increase an emission amount of lighting pulses to be emitted from light source 1 for a measurement section, of the plurality of measurement sections, where a percentage of pixels having lower reflectivities with respect to all pixels is equal to or higher than a predetermined threshold percentage, the lower reflectivities being reflectivities equal to or lower than a predetermined threshold reflectivity, and to (ii) decrease a number of lighting pulses to be emitted from light source 1 for a measurement section, of the plurality of measurement sections, where the percentage is lower than the predetermined threshold percentage.

Here, it is still further that lighting pulse controller 6 controls an emission amount of the lighting pulses to be emitted from light source 1 according to the correction coefficient of each of the measurement sections and a distance from light source 1 to the measurement object in the measurement section.

Furthermore, the distance image generation method according to another aspect of the present disclosure includes: emitting lighting pulses in a predetermined number to a measurement space, and calculating a correction coefficient corresponding to a reflectivity of a measurement object in the measurement space from a distance to the measurement object and an intensity of reflected light; and emitting further lighting pulses of an emission amount corresponding to the correction coefficient to the measurement object, and generating a distance image based on reflected light of the further lighting pulses.

Here, it is possible that in the generating of the distance image, a time range corresponding to a distance in an emission direction of the further lighting pulses is divided into a plurality of measurement sections, and the distance to the measurement object is estimated based on a time taken by the further lighting pulses from being reflected from a measurement section where the measurement object is present among the plurality of measurement sections, until returning.

INDUSTRIAL APPLICABILITY

With the image recognition device according to the present disclosure, a higher-precision image recognition can be provided even in a case where a measurement object having a lower reflectivity is present, and thus the image recognition device is applicable to an image recognition device installed in, for example, a passenger car or the like.

REFERENCE MARKS IN THE DRAWINGS

A image recognition device
1 light source
2 light receiving element (light receiver)
4 image generator
5 reflectivity calculator
6 lighting pulse controller
SX light reception signal

The invention claimed is:

1. An image recognition device, comprising:
   a light source that emits lighting pulses to a measurement space;
   a light receiver that receives reflected light from a measurement object present in the measurement space;
   an image generator that receives a light reception signal based on the reflected light from the light receiver and generates a distance image and a reflectivity image based on the light reception signal;
   a calculator that divides a time range corresponding to a distance in an emission direction of the lighting pulses into a plurality of measurement sections and calculates, based on the reflectivity image, a correction coefficient corresponding to a reflectivity for each of the plurality of measurement sections; and
   a lighting pulse controller that adjusts an emission amount of lighting pulses to be emitted from the light source, according to the correction coefficient for each of the plurality of measurement sections.

2. The image recognition device according to claim 1, wherein as the adjustment of the emission amount, the lighting pulse controller adjusts a number of the lighting pulses to be emitted from the light source.

3. The image recognition device according to claim 1, wherein
   the image generator includes a distance image generator that generates the distance image based on the reflected light, and a luminance image generator that generates a luminance image based on the reflected light, and
   the calculator calculates the correction coefficient based on the distance image and the luminance image.

4. The image recognition device according to claim 1, wherein the lighting pulse controller performs such control that an emission amount of lighting pulses to be emitted from the light source is increased for a measurement section, of the plurality of measurement sections, where a predetermined number or more of pixels having lower reflectivities are present, the lower reflectivities being reflectivities equal to or lower than a predetermined threshold reflectivity.

5. The image recognition device according to claim 4, wherein the lighting pulse controller performs controls to decrease a number of lighting pulses to be emitted from the light source on at least one of a measurement section, of the plurality of measurement sections, where a number of pixels having lower reflectivities is smaller than the predetermined number and a measurement section, of the plurality of measurement sections, where the measurement object is not present.

6. The image recognition device according to claim 1, wherein the lighting pulse controller performs control to (i) increase an emission amount of lighting pulses to be emitted from the light source for a measurement section, of the plurality of measurement sections, where a percentage of pixels having lower reflectivities with respect to all pixels is equal to or higher than a predetermined threshold percentage, the lower reflectivities being reflectivities equal to or lower than a predetermined threshold reflectivity, and to (ii) decrease a number of lighting pulses to be emitted from the light source for a measurement section, of the plurality of measurement sections, where the percentage is lower than the predetermined threshold percentage.

7. The image recognition device according to claim 1, wherein the lighting pulse controller controls an emission amount of the lighting pulses to be emitted from the light source according to the correction coefficient of each of the measurement sections and a distance from the light source to the measurement object in the measurement section.

8. A distance image generation method, comprising:
emitting lighting pulses in a predetermined number to a measurement space, generating a reflectivity image from a distance to a measurement object in the measurement space and an intensity of reflected light, and
calculating a correction coefficient corresponding to a reflectivity of the measurement object based on the reflectivity image; and
emitting further lighting pulses of an emission amount corresponding to the correction coefficient to the measurement object, and
generating a distance image based on reflected light of the further lighting pulses.

9. The distance image generation method according to claim 8, wherein in the generating of the distance image, a time range corresponding to a distance in an emission direction of the further lighting pulses is divided into a plurality of measurement sections, and the distance to the measurement object is estimated based on a time taken by the further lighting pulses from being reflected from a measurement section where the measurement object is present among the plurality of measurement sections, until returning.

* * * * *